(12) United States Patent
Wallace et al.

(10) Patent No.: US 7,561,731 B2
(45) Date of Patent: Jul. 14, 2009

(54) METHOD AND APPARATUS FOR ENHANCING THE DYNAMIC RANGE OF A STEREO VISION SYSTEM

(75) Inventors: Jon K. Wallace, Redford, MI (US); Yun Luo, Livonia, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 857 days.

(21) Appl. No.: 11/022,723

(22) Filed: Dec. 27, 2004

(65) Prior Publication Data

US 2006/0140510 A1    Jun. 29, 2006

(51) Int. Cl.
G06K 9/00    (2006.01)
G06K 9/40    (2006.01)
G06K 9/32    (2006.01)

(52) U.S. Cl. .................. 382/154; 382/106; 382/274; 382/299

(58) Field of Classification Search .......... 382/106, 382/154, 274, 299
See application file for complete search history.

(56) References Cited

U.S. PATENT DOCUMENTS

| | | | |
|---|---|---|---|
| 5,179,441 A | | 1/1993 | Anderson et al. |
| 5,455,621 A | * | 10/1995 | Morimura ............. 348/229.1 |
| 5,818,975 A | * | 10/1998 | Goodwin et al. ......... 382/274 |
| 5,828,793 A | * | 10/1998 | Mann ..................... 382/284 |
| 5,929,908 A | * | 7/1999 | Takahashi et al. ........ 348/364 |
| 6,204,881 B1 | * | 3/2001 | Ikeda et al. ............. 348/362 |
| 6,753,876 B2 | | 6/2004 | Brooksby et al. |
| 6,952,234 B2 | * | 10/2005 | Hatano .................. 348/363 |
| 7,103,212 B2 | * | 9/2006 | Hager et al. ............ 382/154 |
| 7,142,723 B2 | * | 11/2006 | Kang et al. ............. 382/254 |
| 2002/0012071 A1 | | 1/2002 | Sun |
| 2002/0050924 A1 | * | 5/2002 | Mahbub ................. 340/426 |
| 2002/0176010 A1 | * | 11/2002 | Wallach et al. ......... 348/229.1 |
| 2003/0095189 A1 | | 5/2003 | Liu et al. |
| 2003/0098919 A1 | | 5/2003 | Liu et al. |
| 2003/0184673 A1 | * | 10/2003 | Skow .................... 348/364 |
| 2003/0204384 A1 | * | 10/2003 | Owechko et al. ........... 703/1 |
| 2004/0109206 A1 | | 6/2004 | Lehman |
| 2005/0275747 A1 | * | 12/2005 | Nayar et al. ............ 348/362 |

OTHER PUBLICATIONS

Yang et al., *Comparative Analysis of SNR for Image Sensors with Enhance Dynamic Range*, Information Systems Laboratory, Stanford University, Undated.

* cited by examiner

*Primary Examiner*—Matthew C Bella
*Assistant Examiner*—Michael A Newman
(74) *Attorney, Agent, or Firm*—Tarolli, Sundheim, Covell & Tummino LLP (57) ABSTRACT

Systems and methods are provided for producing a stereo disparity map representing an imaged subject. A plurality of sensors (102 and 104) are operative to produce a plurality of images. Each image has an associated exposure according to an exposure level of an associated sensor. A system control (106) determines exposure levels for the plurality of sensors according to an exposure selection algorithm. A disparity processing component (112) is operative to generate a stereo disparity map from a plurality of images. An image merger (110) is operative to merge a plurality of images to produce a composite image having an increased dynamic range.

18 Claims, 6 Drawing Sheets

METHOD AND APPARATUS FOR ENHANCING THE DYNAMIC RANGE OF A STEREO VISION SYSTEM

TECHNICAL FIELD

The present invention is directed generally to stereo vision systems and is particularly directed to a method and apparatus for improving the dynamic range of a stereo vision system. The present invention is particularly useful in occupant restraint systems for object and/or occupant classification.

BACKGROUND OF THE INVENTION

Actuatable occupant restraining systems having an inflatable air bag in vehicles are known in the art. Such systems that are controlled in response to whether the seat is occupied, an object on the seat is animate or inanimate, a rearward facing child seat present on the seat, and/or in response to the occupant's position, weight, size, etc., are referred to as smart restraining systems. One example of a smart actuatable restraining system is disclosed in U.S. Pat. No. 5,330,226.

The effectiveness of control algorithms for smart occupant restraint systems can be enhanced by providing noise-free, high dynamic range images to the control system. To this end, some imaging systems employ a multiple slope technology to increase the intra-scene dynamic range of an associated image sensor. A compression scheme is utilized to fit the addition information representing the extended dynamic range into the same number of bits per pixel. This compression results in a loss of image contrast which can have a negative impact on the operation of the control algorithm.

SUMMARY OF THE INVENTION

In accordance with one aspect of the present invention, a system is provided for producing a stereo disparity map representing an imaged subject. A plurality of sensors are operative to produce a plurality of images. Each image has an associated exposure according to an associated exposure level of an associated sensor. A system control determines exposure levels for the plurality of sensors according to an exposure selection algorithm. A disparity processing component is operative to generate a stereo disparity map from a plurality of images. An image merger is operative to merge a plurality of images to produce a composite image having an increased dynamic range.

In accordance with another aspect of the present invention, a method is provided for producing a stereo disparity map having an enhanced dynamic range. A first exposure level is determined for a first image set according to an exposure selection algorithm. The first image set is generated at the determined first exposure level. A first stereo disparity map, having an associated dynamic range, is generated from the first image set. A second exposure level is determined for a second image set according to the exposure selection algorithm. The second image set is generated at the determined second exposure level. A second stereo disparity map, having an associated dynamic range, is generated from the second image set. The first stereo disparity map and the second stereo disparity map are merged as to produce a composite stereo disparity map having an effective dynamic range greater than either of the associated dynamic ranges of the first disparity map and the second disparity map.

In accordance with yet another aspect of the present invention, a method is provided for generating a stereo disparity map having an enhanced dynamic range. A desired exposure level is determined for each of a plurality of images. The plurality of images includes a first set of images and a second set of images. Each of the plurality of images is generated at the desired level of exposure. The first set of images is merged to produce a first composite image. The second set of images is merged to produce a second composite image. A stereo disparity map is generated from the first composite image and the second composite image.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF PREFERRED EMBODIMENT

Figure 1:
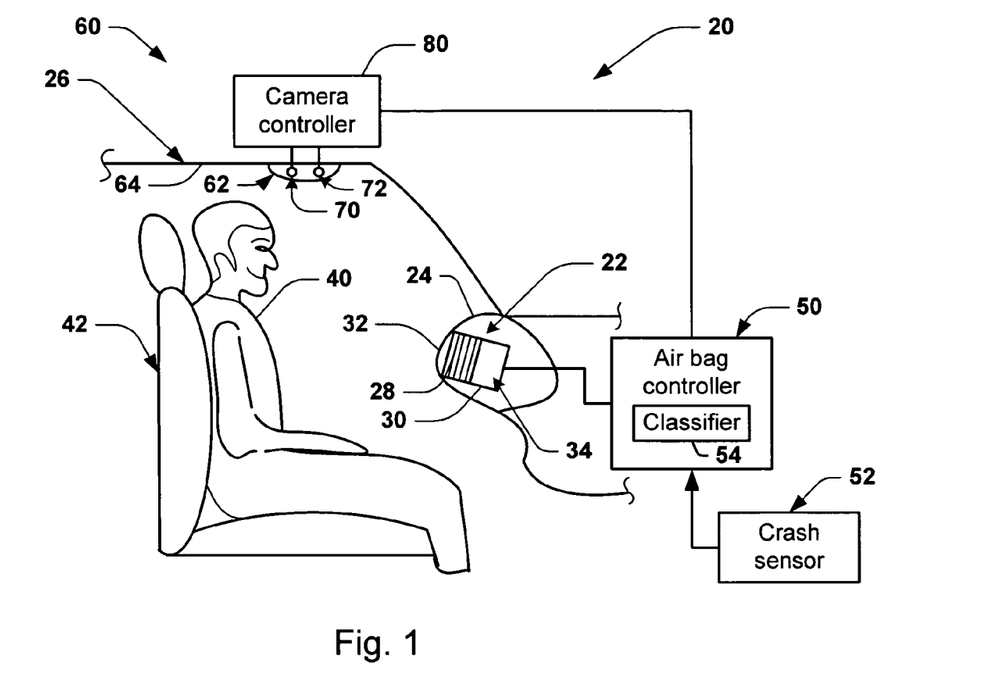
FIG. 1 is a schematic illustration of an actuatable restraining system in accordance with an exemplary embodiment of the present invention.

Referring to FIG. 1, an exemplary embodiment of an actuatable occupant restraint system 20, in accordance with the present invention, includes an air bag assembly 22 mounted in an opening of a dashboard or instrument panel 24 of a vehicle 26. The air bag assembly 22 includes an air bag 28 folded and stored within the interior of an air bag housing 30. A cover 32 covers the stored air bag and is adapted to open easily upon inflation of the air bag 28.

The air bag assembly 22 further includes a gas control portion 34 that is operatively coupled to the air bag 28. The gas control portion 34 may include a plurality of gas sources (not shown) and vent valves (not shown) for, when individually controlled, controlling the air bag inflation, e.g., timing, gas flow, bag profile as a function of time, gas pressure, etc. Once inflated, the air bag 28 may help protect an occupant 40, such as a vehicle passenger, sitting on a vehicle seat 42. Although the embodiment of FIG. 1 is described with regard to a vehicle passenger seat, it is applicable to a vehicle driver seat and back seats and their associated actuatable restraining systems. The present invention is also applicable to the control of side actuatable restraining devices and to actuatable devices deployable in response to rollover events.

An air bag controller 50 is operatively connected to the air bag assembly 22 to control the gas control portion 34 and, in turn, inflation of the air bag 28. The air bag controller 50 can take any of several forms such as a microcomputer, discrete circuitry, an application-specific-integrated-circuit ("ASIC"), etc. The controller 50 is further connected to a vehicle crash sensor 52, such as one or more vehicle crash accelerometers. The controller monitors the output signal(s) from the crash sensor 52 and, in accordance with an air bag control algorithm using a deployment control algorithm, determines if a deployment event is occurring, i.e., one for which it may be desirable to deploy the air bag 28. There are several known deployment control algorithms responsive to deployment event signal(s) that may be used as part of the present invention. Once the controller 50 determines that a deployment event is occurring using a selected crash analysis algorithm, for example, and if certain other occupant characteristic conditions are satisfied, the controller 50 controls inflation of the air bag 28 using the gas control portion 34, e.g., timing, gas flow rate, gas pressure, bag profile as a function of time, etc.

The air bag restraining system 20, in accordance with the present invention, further includes a stereo-vision assembly 60. The stereo-vision assembly 60 includes stereo-cameras 62 preferably mounted to the headliner 64 of the vehicle 26. The stereo-vision assembly 60 includes a first camera 70 and a second camera 72, both connected to a camera controller 80. In accordance with one exemplary embodiment of the present invention, the cameras 70, 72 are spaced apart by approximately 35 millimeters ("mm"), although other spacing can be used. The cameras 70, 72 are positioned in parallel with the front-to-rear axis of the vehicle, although other orientations are possible.

The camera controller 80 can take any of several forms such as a microcomputer, discrete circuitry, ASIC, etc. The camera controller 80 is connected to the air bag controller 50 and provides a signal to the air bag controller 50 to provide data relating to various image characteristics of the occupant seating area, which can range from an empty seat, an object on the seat, a human occupant, etc. Herein, image data of the seating area is generally referred to as occupant data, which includes all animate and inanimate objects that might occupy the occupant seating area. The air bag control algorithm associated with the controller 50 can be made sensitive to the provided image data. For example, if the provided image data indicates that the occupant 40 is an object, such as a shopping bag, and not a human being, actuating the air bag during a crash event serves no purpose. Accordingly, the air bag controller 50 can include a pattern recognition classifier assembly 54 operative to distinguish between a plurality of occupant classes based on the image data provided by the camera controller 80 that can then, in turn, be used to control the air bag.

Figure 2:
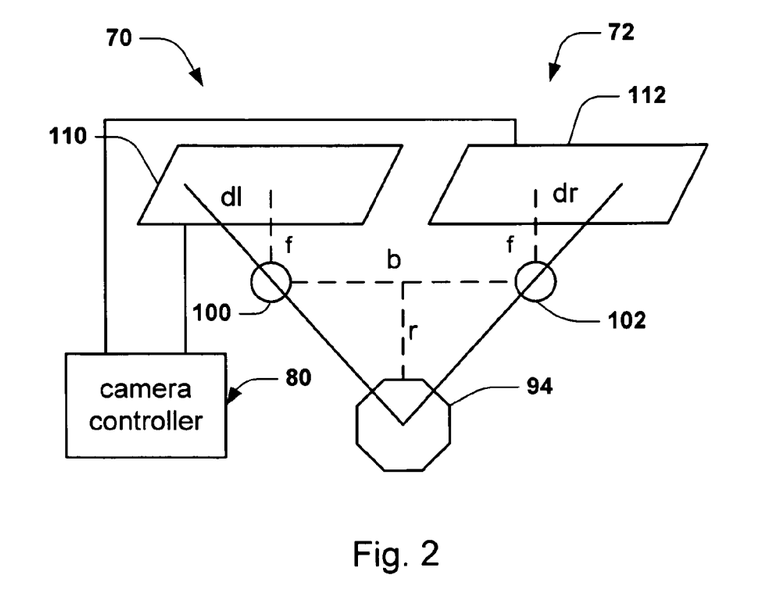
FIG. 2 is a schematic illustration of a stereo camera arrangement for use with the present invention for determining location of an occupant's head.

FIG. 2 is a schematic illustration of the cameras 70 and 72 of the imaging device. The cameras 70 and 72 may be of any several known types. For example, the cameras may be charge-coupled devices ("CCD") or complementary metal-oxide semiconductor ("CMOS") devices. Preferably, the cameras 70 and 72 take two-dimensional, grayscale images of the passenger compartment of the vehicle 26. In one exemplary embodiment of the present invention, the cameras 70 and 72 are wide spectrum response cameras that cover the visible and near-infrared spectrums.

The cameras 70 and 72 are spaced apart from one another so as to enable the cameras to be used for determining a distance, also called a "range," from the cameras to an object. The object is shown schematically in FIG. 2 and is indicated by reference numeral 94. The distance between the cameras 70 and 72 and the object 94 may be determined by using triangulation. The cameras 70 and 72 have different views of the passenger compartment due to the position of the object 94 relative to each camera 70 and 72 being different. As a result, the object 94 is located at a different position in the image obtained by camera 70 than in the image obtained by camera 72. The difference in the positions of the object 94 in the images is referred to as "disparity." To get a proper disparity between the images for performing triangulation, it is desirable for the cameras 70 and 72 to be positioned so that the object 94 to be monitored is within the horopter of the cameras.

Camera 70 includes a lens 100 and a pixel array 110. Likewise, camera 72 includes a lens 102 and a pixel array 112. Since the cameras 70 and 72 are located at different positions relative to the object 94, an image of the object 94 formed on the pixel array 110 of camera 70 differs from an image of the object 94 formed on the pixel array 112 of camera 72. The distance between the viewpoints of the cameras 70 and 72, i.e., the distance between the lenses 100 and 102, is designated "b" in FIG. 2. The focal length of the lenses 100 and 102 of the cameras 70 and 72 is designated as "f" in FIG. 2. The lenses 100 and 102 of the cameras 70 and 72 of FIG. 2 have the same focal lengths. The horizontal distance from the image center on the pixel array 110 and the image of the object 94 on the pixel array 110 of camera 70 is designated "dl" in FIG. 2. The horizontal distance from the image center on the pixel array 112 and the image of the object 94 on the pixel array 112 for the camera 72 is designated "dr" in FIG. 2. Preferably, the cameras 70 and 72 are mounted so that they are in the same image plane. The difference between dl and dr is referred to as the "image disparity" and is directly related to the distance, designated "r" in FIG. 2, to the object 94 where the distance r is measured normal to the image plane of cameras 70 and 72 from a location v on the image plane. It will be appreciated that $$r = bf/d, \text{ where } d = dl - dr. \quad \text{(Equation 1)}$$

From equation 1, the distance r to the object 94 as a function of disparity of the images from cameras 70 and 72 can be determined. It should be appreciated that the distance r is an inverse function of disparity.

Figure 3:
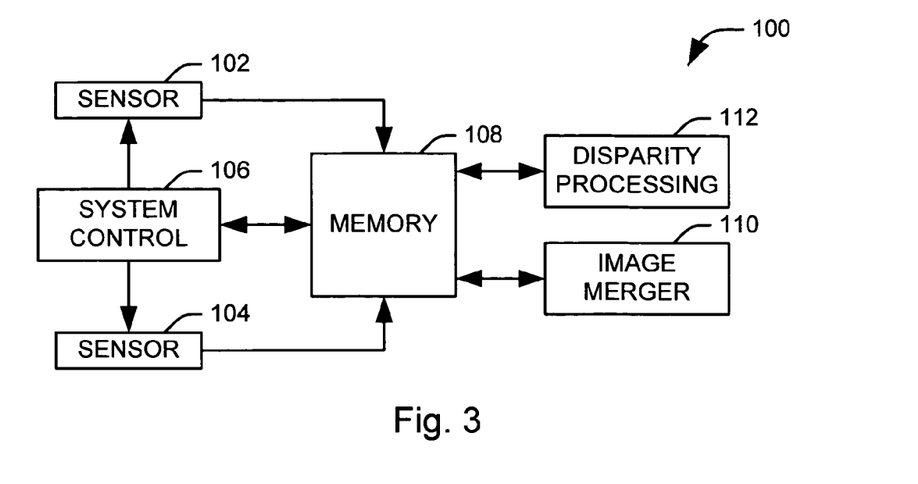
FIG. 3 illustrates a stereo imaging system having improved dynamic range in accordance with an aspect of the present invention.

Referring to FIG. 3, a stereo imaging system 100 having improved dynamic range is shown. The system 100 includes a plurality of image sensors 102 and 104, each of which is operative to produce a two-dimensional image of a desired subject. It will be appreciated that the sensors can be of any appropriate design for a given application and can image a subject from reflected infrared, ultraviolet, and other electromagnetic radiation as well as light within the human visible spectrum. The sensors 102 and 104 are spaced apart by a desired distance to enable the cameras to be used for stereo imaging. The sensors 102 and 104 can be configured by a system control 106 to set a level of exposure associated with each sensor (e.g., 102). It will be appreciated that the level of exposure can be adjusted in several ways, including literally changing the exposure time associated with the sensor for a given image or increasing the gain for each pixel in the image. It will be appreciated that the exposure for each sensor (e.g., 102) can be set dynamically by the system control 106 such that each sensor can generate images at different levels of resolution.

Multiple images can be generated at each sensor (e.g., 102) at a variety of different exposure settings and the images can be stored in a system memory 108. It will be appreciated that by taking the plurality of images over a relatively short period, temporal effects (e.g., movement of the subject, lighting changes, etc.) across the images taken at each sensor can be minimized. The stored images can be accessed by an image merger 110 and a disparity processing component 112. The image merger 110 can combine multiple images associated with a single sensor to create a new image having an increased dynamic range. The new image can be stored in the memory 108 for later processing. The disparity processing component 112 can take two images, each associated with a different sensor, to produce a stereo disparity map. The newly created stereo disparity map can also be stored in memory for later processing.

The image merger 110 can comprise any appropriate device for combining two images as to increase their associated dynamic range. For example, the image merger can merge n images by performing a weighted pixel-by-pixel combination of a function the intensity of each pixel, such that $$I_m = w_1 f_1(I_1) + w_2 f_2(I_2) + \ldots + w_n f_n(I_n) \quad \text{(Equation 2)}$$

wherein $I_m$ is the combined intensity value, $w_x$ is a weight value associated with a given image, x, from the n images, $f_x(I_x)$ is a function of a the intensity of a pixel from a given image, x, from the n images.

It will be appreciated that the image merger 110 can combine a set of images from a given sensor having varying levels of exposure to create an enhanced image associated with the given sensor as well as on a set of related (e.g., created from the same pair of two sensors) stereo disparity maps created by the disparity processing component 112.

The disparity processing component 112 can combine images from a set of two or more sensors to produce a stereo disparity map associated with the two or more sensors, as described above in FIG. 2. In accordance with an aspect of the present invention, the set of images can be selected to have the same level of exposure, such that the stereo disparity map has an associated, uniform level of exposure.

Figure 4:
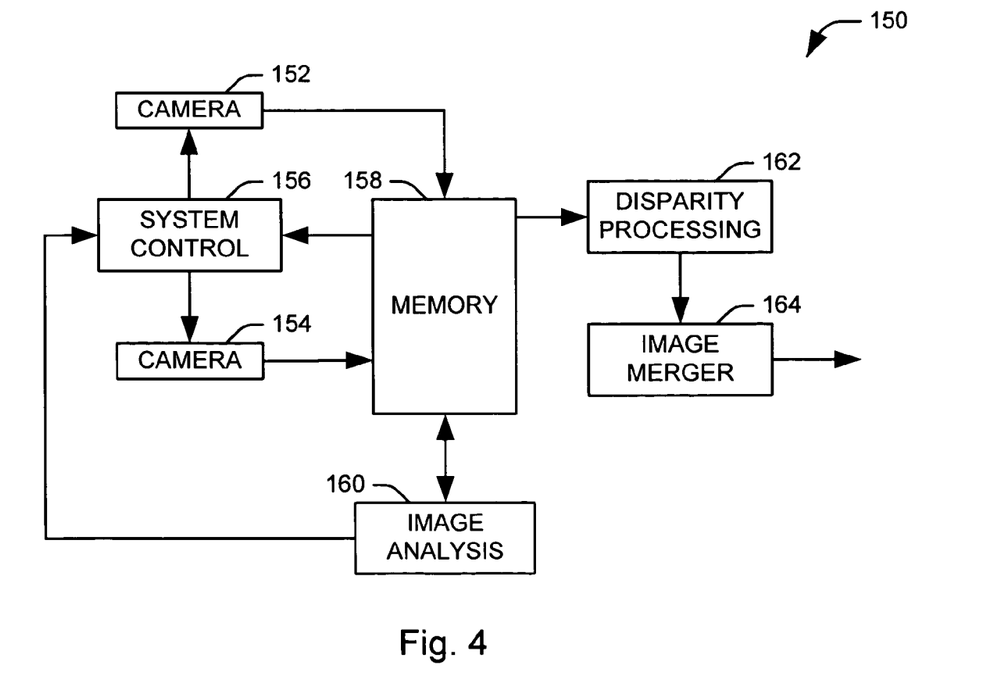
FIG. 4 illustrates a first exemplary imaging system in accordance with an aspect of the present invention.

FIG. 4 illustrates a first exemplary imaging system 150 in accordance with an aspect of the present invention. The system 152 includes two cameras 152 and 154 that are operative to generate a two dimensional image of a desired subject. For example, the cameras can be configured to image the contents of a vehicle seat as part of a control system for a smart actuatable restraint system. The cameras are spaced from one another to allow their output to be used in stereo imaging as described in FIG. 2.

The cameras are operatively connected to a system control 156. The system control 156 regulates an exposure or gain level associated with the cameras 152 and 154, such that the image produced by the camera will exhibit a desired level of exposure. In the illustrated example, the system control 156 sets the exposure at the two cameras 152 and 154 at a common, desired level of exposure according to an associated exposure selection algorithm. The system then directs the cameras 152 and 154 to produce an image of the subject. These steps can repeated multiple times over a short interval to produce a series of image pairs having varying levels of resolution.

In the illustrated embodiment, the series of image pairs can be provided to a memory 158, where they can be retrieved by an image analysis component 160. The image analysis component 160 evaluates each image pair to determine the prevalence of dark and saturated regions within the image pair. A dark region is a region in which at least a designated percentage of the pixels are below a first threshold of intensity, or brightness. Conversely, a saturated region is a region of the image in which at least a designated percentage of the pixels are above a second threshold level of intensity. The designated percentage for a given region will generally be high and, for some applications, the designated percentage can be one hundred percent. It will be appreciated that the presence of dark or saturated regions within an image can indicate a loss of information within the image. The image analysis component 160 calculates statistics associated with the dark and saturated regions and provides the information to the system control 156. The system control 156 can utilize the statistics as feedback to the exposure control algorithm to control the exposure of the cameras 152 and 154.

The image pairs are then provided to a disparity processing component 162 that creates a series of stereo disparity maps, each having an associated exposure level from the series of image pairs. The series of stereo disparity maps can then be provided to an image merger 164. The image merger 164 combines the series of stereo disparity maps to create a single stereo disparity map having an enhanced dynamic range.

Figure 5:
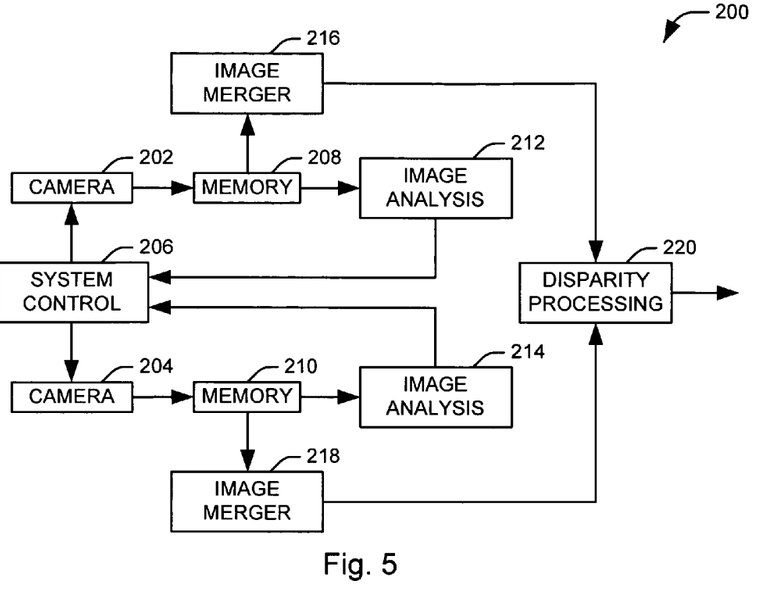
FIG. 5 illustrates a second exemplary imaging system in accordance with an aspect of the present invention.

FIG. 5 illustrates a second exemplary imaging system 200 in accordance with an aspect of the present invention. The system 202 includes two cameras 202 and 204 that are operative to generate a two dimensional image of a desired subject. For example, the cameras can be configured to image the contents of a vehicle seat as part of an air bag control system. The cameras are spaced from one another to allow their output to be used in stereo imaging as described in FIG. 2.

The cameras are operatively connected to a system control 206. The system control 206 regulates an exposure or gain level associated with the cameras 202 and 204, such that the image produced by the camera will exhibit a desired level of exposure. In the illustrated example, the system control 206 sets the exposure of each of the two cameras 202 and 204 at a desired level of exposure according to an associated exposure selection algorithm. It will be appreciated that the exposure level of each camera 202 and 204 can be changed independently according to feedback from associate image analysis systems 208 and 210. The system control 206 directs the cameras 202 and 204 to produce an image of the subject. These steps can repeated multiple times over a short interval to produce a series of images having varying levels of resolution for each camera.

In the illustrated embodiment, the images produced at each of the cameras 204 and 206 can be provided to respective memories 212 and 214. The stored images can be evaluated by the image analysis component (e.g., 208) associated with each camera to determine the prevalence of dark and saturated regions within the images. The image analysis components 208 and 210 calculate statistics associated with the dark and saturated regions and provide the information to the system control 206. The system control 206 can utilize the statistics as feedback to the exposure control algorithm to control the exposure of the each of the cameras 202 and 204.

In accordance with one aspect of the invention, the operation of the exposure control algorithm can include setting the exposure level associated with a given camera at a predetermined maximum level. An image is then captured at the camera and provided to the image analysis component 208. The image analysis component 208 evaluates the image for regions of saturation. If the area of the saturated regions is too large, the system control 206 can direct the camera to generate another image having a reduced level of exposure. This image is then evaluated at the image analysis component, although the evaluation is limited to the regions of saturation from the previous image. This procedure is repeated until the area of the saturated regions reach an acceptable level.

Once an appropriate series of images has been generated at each camera (e.g., 202), the image series can be combined at respective image mergers 216 and 218. Each image merger (e.g., 216) produces a composite image having a dynamic range greater than that of its constituent images. In an exemplary embodiment, a given image merger (e.g., 216) calculates a pixel intensity value for the composite image according to the sum of weighted functions of the intensity values of corresponding pixels across a series of images. It will be appreciated, however, that the merger of the images can be accomplished in a variety of ways. For example, the images can be combined in a piecewise fashion to correct dark or saturated regions within a given image. The composite images from the image mergers 216 and 218 are then provided to a disparity processing component 220 that creates a stereo disparity map from the two composite images. It will be appreciated that the resulting stereo disparity map will have an enhanced dynamic range due to the improved dynamic range of the composite images.

Figure 6:
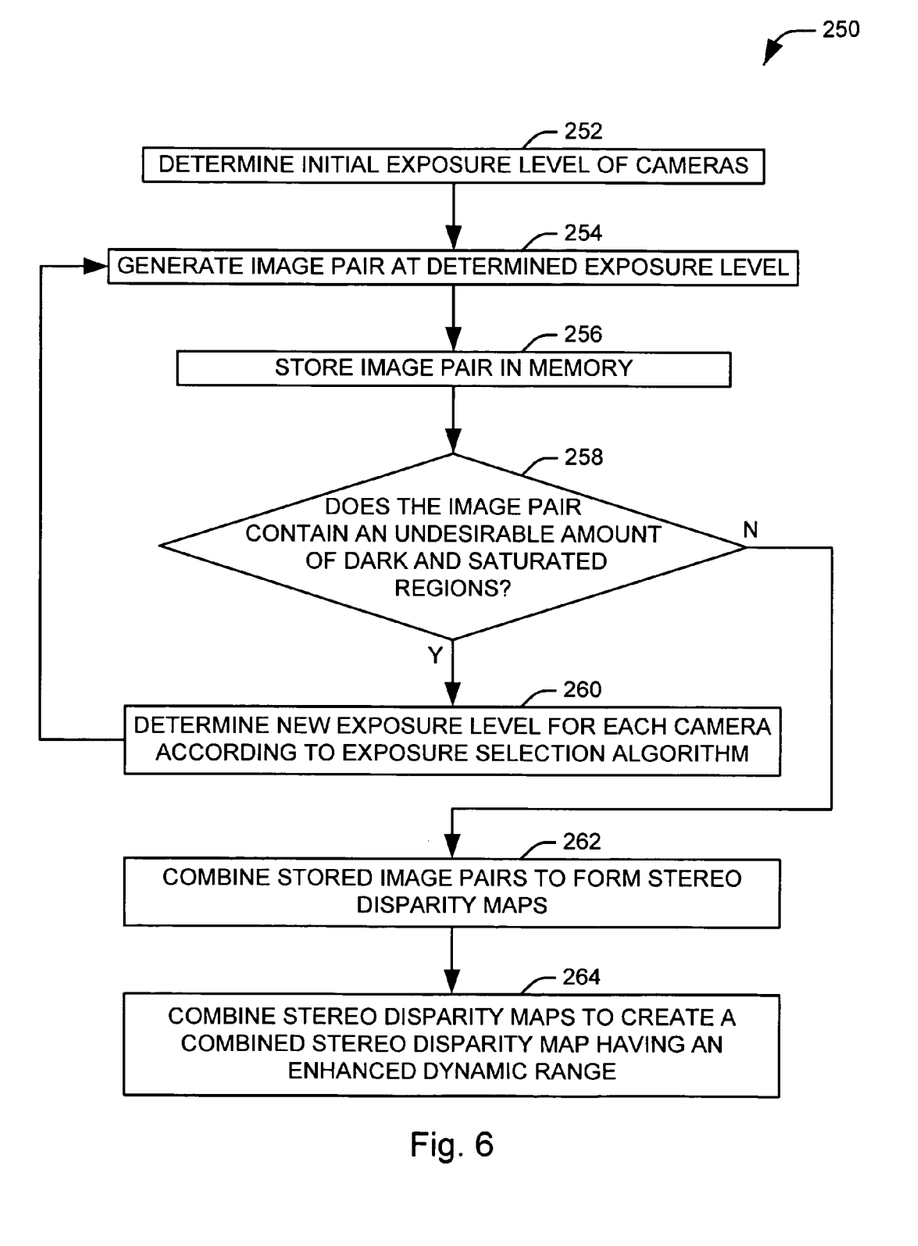
FIG. 6 is a flow diagram of a first exemplary methodology for producing a stereo disparity map having an enhanced dynamic range in accordance with an aspect of the present invention.

FIG. 6 is a flow diagram of an exemplary methodology 250 for producing a stereo disparity map having an enhanced dynamic range. Although serial and parallel processing is shown, the flow diagram is given for explanation purposes only and the order of the steps and the type of processing can vary from that shown. The illustrated methodology 250 is described as utilizing two cameras, but it will be appreciated that the methodology can make use of input from more than two cameras in accordance with an aspect of the present invention.

The methodology begins at step 252, where an initial exposure level is determined for a pair of cameras in accordance with an associated exposure selection algorithm. For example, the initial exposure level for the cameras can be determined as a function of one or more exposure levels determined for a previous stereo disparity map. Alternatively, a predetermined, constant initial exposure level can be utilized. Once the initial exposure level is determined, the methodology advances to step 254, where an image is taken at each camera at the determined exposure level to produce an image pair.

At step 256, the image pair is stored in memory. The image pair is then evaluated at step 258 to determine if the image pair contains an unacceptable amount of dark and saturated regions. For example, it can be determined if the area within the images associated within the saturated or dark regions exceeds a certain percentage of the total area. The analysis can be limited to regions of interest within the image, as to reduce the overall amount of processing. If the image pair contains an unacceptable area of dark and saturated regions, the methodology advances to step 260 to determine a new exposure level for the cameras according to an exposure selection algorithm. For example, the new exposure level for the camera can be determined as a function of the difference between an average saturation level over the evaluated region of the image and a desired average saturation level for the region.

The methodology then returns to step 254 where a new image pair is generated. They are stored, along with the original image pair at step 256, and the new image pair is evaluated at step 258. In an exemplary embodiment, only the areas within the image pair corresponding to the dark and saturated regions within the previous image pair are evaluated. These steps are repeated until a desired level of dark and saturated regions is achieved.

Once an image pair contains an acceptable proportion of dark and saturated regions, the methodology advances to step 262. At step 262, each of the stored image pairs are combined to form a plurality of stereo disparity maps. It will be appreciated that each stereo disparity map will have an associated exposure based upon the exposure level used in generating the images. At step 264, the stereo disparity maps are merged into a combined stereo disparity map having an enhanced dynamic range. This can be accomplished by any of a number of merging algorithms that effectively combine the various disparity maps while preserving the entire dynamic range represented by the plurality of disparity maps.

Figure 7:
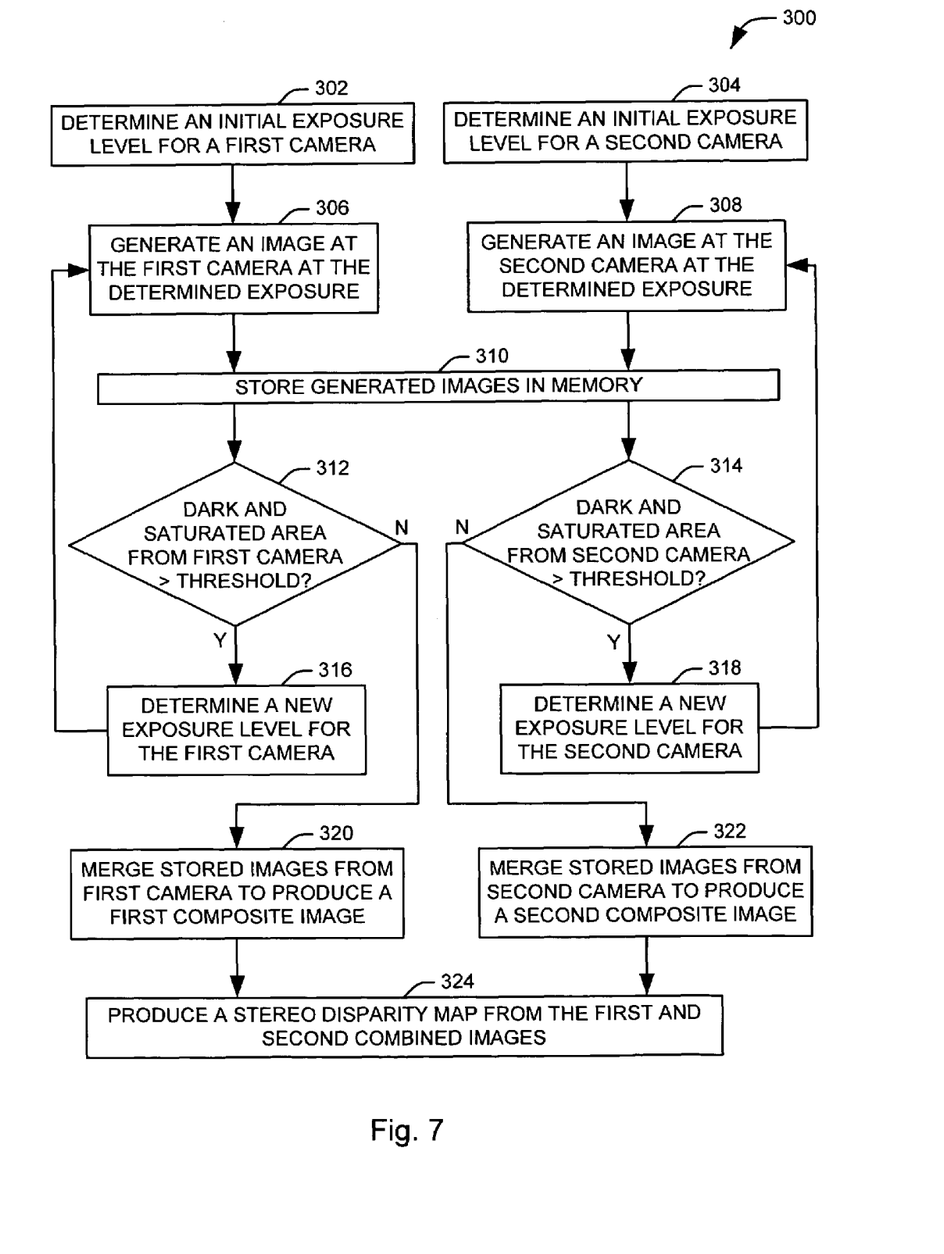
FIG. 7 is a flow diagram of a second exemplary methodology for producing a stereo disparity map having an enhanced dynamic range in accordance with the present invention.

FIG. 7 is a flow diagram of an exemplary methodology 300 for producing a stereo disparity map having an enhanced dynamic range. Although serial and parallel processing is shown, the flow diagram is given for explanation purposes only and the order of the steps and the type of processing can vary from that shown. For example, while some steps (e.g., 320 and 322) are shown as executing in parallel to facilitate the illustration, these steps can be executed in series in some implementations of the invention. The illustrated methodology 300 is described as utilizing two cameras, but it will be appreciated that the methodology can be make use of input from more than two cameras in accordance with an aspect of the present invention.

The methodology begins at step 302 where an initial exposure level is determined for each of a plurality of cameras in accordance with respective associated exposure selection algorithms. It will be appreciated that the exposure selection algorithms can perform independently to account for differing circumstances of the cameras, such as any change in lighting attributable to the spacing between the cameras. Conversely, a common exposure level can be maintained between the plurality of cameras. In one example, the initial exposure level for a given camera can be determined as a function of one or more exposure levels determined at that camera for a previous stereo disparity map. Alternatively, a predetermined, constant initial exposure level can be utilized.

Once the initial exposure level is determined, the methodology advances to step 306 where an image is taken at each camera at its determined exposure level. The resulting images are stored in memory at step 310. Each image is then evaluated at step 312 to determine if the images contain an unacceptable amount of dark and saturated regions. The evaluation can be performed in a number of ways. For example, it can be determined if a threshold number of individual pixels within a given image or image set have intensity values within a predefined saturation or dark range. Alternatively, it can be determined if an threshold portion of the area of the image or image set consists of dark or saturated regions, wherein a given region is a group of contiguous pixels of at least a predetermined area in which at least a threshold percentage of the pixels have intensity values within the saturation or dark range.

If it is determined that an image set has an unacceptable amount of dark or saturated content, the methodology advances to step 316 where a new exposure level is determined for each camera associated with the image according to the exposure selection algorithm for the camera. For example, the new exposure can be determined by determining the number of pixels falling within each of a plurality of intensity ranges within the image set. These values can be compared to a series of desired values for the ranges. In one implementation, the new exposure is selected as to minimize the sum of the squared differences between the target values and the expected values given a new exposure level.

The methodology then returns to step 306 where a new image is generated at each camera using the new exposure level. The new images are stored in memory, along with the original images, at step 310 and evaluated at step 312. In an exemplary embodiment, only the areas within the corresponding to the dark and saturated regions within the previous image set are evaluated. These steps are repeated until a desired level of dark and saturated content is achieved.

When an image having a desirable level of dark and saturated content has been produced for both cameras, the methodology advances to steps 320 and 322. At steps 320 and 322, the stored images produced by each camera are merged to form respective first and second composite images. It will be appreciated that the dynamic range associated with each the first and second composite images will be greater than that of its constituent images. The merger can be accomplished in a number of ways, depending on the requirements of a given implementation. In an exemplary embodiment, the images are merged by a pixel-by-pixel summation of weighted functions of intensity values of corresponding pixels across the set of stored images associated with each camera. Finally, at step 324, a stereo disparity map is generated from the first and second composite images. The range values obtained in generating the disparity map can be checked against a range of acceptable values, and unacceptable results can be ignored, such that all or a portion of the resulting stereo disparity map will be discarded.

Figure 8:
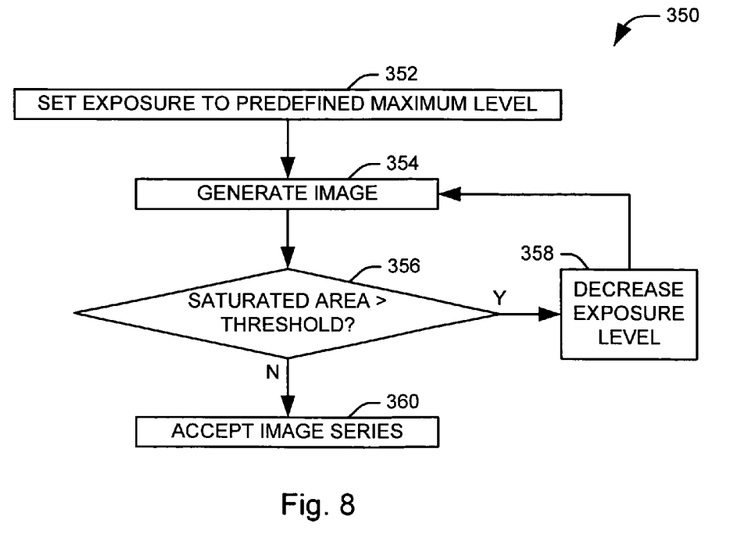
FIG. 8 illustrates a first exemplary exposure selection algorithm in accordance with an aspect of the present invention.

FIG. 8 illustrates a first exemplary exposure selection algorithm in accordance with an aspect of the present invention. A methodology 350 representing the algorithm begins at step 352, where the exposure level for one or more cameras is set at a predefined maximum level. The camera then generates a first image for an image set at the maximum exposure level at step 354. The image is then evaluated at step 356 to determine if the saturated regions within the image exceed a threshold percentage of the total area of the image.

If the saturated regions within the image exceed a threshold percentage of the total area of the image, the exposure level for the camera is decreased at step 358. For example, the exposure level can be decreased by a predetermined value or by a value determined from the area of the saturated regions. The methodology 350 then returns to step 354 to generate a new image for the image set at the new exposure level. The new image is evaluated to determine if the area of the saturated regions has fallen below the threshold percentage at step 356. In an exemplary embodiment, only the portion of the image corresponding to the saturated regions of the original image is evaluated. The process is repeated until the area of the saturated regions falls below a threshold value, at which point the image set is accepted at step 360.

It will be appreciated that the above methodology can be adapted to begin at a minimum exposure level and advance through progressively higher levels of exposure. In such a case, the image would be evaluated for dark regions and continue until the area of the dark regions dropped below a desired threshold percentage of the total area.

Figure 9:
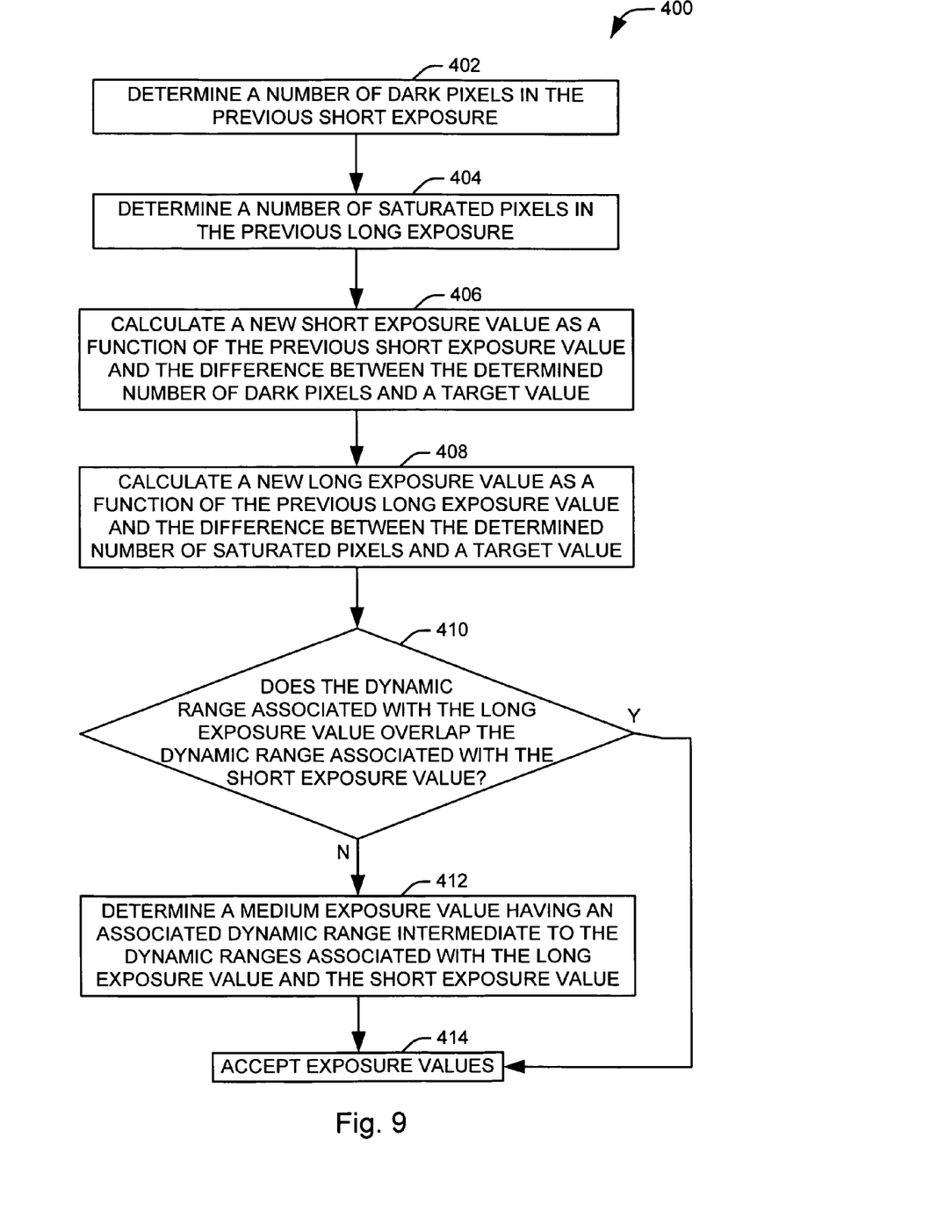
FIG. 9 illustrates a second exemplary exposure selection algorithm in accordance with an aspect of the present invention.

FIG. 9 illustrates a second exemplary exposure selection algorithm in accordance with an aspect of the present invention. The second exemplary algorithm utilizes exposure levels from the generation of a previous stereo disparity map to determine appropriate exposure levels for current images. In the illustrated methodology, each iteration uses at least a short exposure value and a long exposure value in generating one or more composite images. In accordance with the methodology, new long and short exposure values are determined at each iteration along with a medium exposure value if it is determined that additional coverage is necessary.

The methodology begins at step 402 where the number of dark pixels within an image associated with the short exposure value is determined. At step 404, the number of saturated pixels within an image associated with the long exposure value is determined. At step 406, a new short exposure value is determined. First, the difference between the determined number of dark pixels in the previous short exposure image and a target value is determined. The new short exposure value is calculated as a function of the previous short exposure value and the determined difference. For example, the new short exposure value can be equal to the sum of the previous short exposure level and the product of the determined difference and a constant.

At step 408, a new long exposure value is determined in the same manner. The difference between the determined number of saturated pixels in the previous long exposure image and a target value is determined. The new long exposure value is calculated as a function of the previous long exposure value and the determined difference. For example, the new long exposure value can be equal to the sum of the previous long exposure level and the product of the determined difference and a constant.

The methodology then advances to step 410, where it is determined if the new long exposure value and short exposure value will cover an entire desired dynamic range. Specifically, it is determined if a dynamic range expected in an image produced using the short exposure value will overlap a dynamic range expected in an image produced using the long exposure value. If not, the methodology advances to step 412, where a medium exposure value is selected, such that the dynamic range expected in an image produced using the medium exposure value will cover the gap between the dynamic ranges associated with the long and short exposure values. The methodology then advances to step 414. If the dynamic ranges associated with the long and short exposure values overlap, the methodology proceeds directly to step 414. At 414, the exposure values are accepted and the methodology ends.

From the above description of the invention, those skilled in the art will perceive improvements, changes, and modifications. Such improvements, changes, and modifications within the skill of the art are intended to be covered by the appended claims.

Having described the invention, the following is claimed:

1. A system for producing a stereo disparity map representing an imaged subject, the system comprising:

a plurality of sensors configured to produce a first plurality of images according to a first exposure level for the plurality of sensors;

a disparity processing component that is configured to generate a first stereo disparity map from the first plurality of images;

a system control configured to select a second exposure level for the plurality of sensors according to an exposure selection algorithm if the stereo disparity map contains an unacceptable amount of dark or saturated pixels, direct the plurality of sensors to produce a second plurality of images, and direct the disparity processing component to generate a second stereo disparity map from the second plurality of images; and an image merger that is configured to merge the first stereo disparity map and the second stereo disparity map, the merger of the first stereo disparity map and the second stereo disparity map being performed as to produce a composite stereo disparity map having an increased dynamic range.

2. The system of claim 1 wherein the image merger is operative to provide the composite image to the system control, and the system control configured to select a third exposure level for the plurality of sensors according to the exposure selection algorithm if the composite image contains an unacceptable amount of dark or saturated pixels, direct the plurality of sensors to produce a third plurality of images, and direct the disparity processing component to generate a third stereo disparity map from the second plurality of images, the image merger being configured to merge the third stereo disparity map and the composite stereo disparity map to produce a new composite stereo disparity map having an increased dynamic range.

3. The system of claim 1 wherein the image merger combines the first stereo disparity map and the second stereo disparity map by summing the intensity values of corresponding pixels across the the first stereo disparity map and the second stereo disparity map.

4. The system of claim 3, wherein the image merger sums corresponding pixels only within a region of interest within the the first stereo disparity map and the second stereo disparity map.

5. An actuatable vehicle occupant restraint system comprising the system of claim 1.

6. The system of claim 1, the system further comprising an image analysis component that evaluates the plurality of images generated by the sensors and provides statistics relating to at least one of the plurality of images to the system control.

7. A method for producing a stereo disparity map having an enhanced dynamic range, comprising:
   determining a first exposure level for a first image set according to an exposure selection algorithm;
   generating the first image set at the determined first exposure level;
   generating a first stereo disparity map from the first image set, the first stereo disparity map having an associated dynamic range;
   determining a second exposure level for a second image set according to the exposure selection algorithm;
   generating the second image set at the determined second exposure level;
   generating a second stereo disparity map from the second image set, the second stereo disparity map having an associated dynamic range; and
   merging the first stereo disparity map and the second stereo disparity map such that the intensity value for each pixel within a composite stereo disparity map is a linear combination of respective intensity values for corresponding pixels in the first stereo disparity map and the second stereo disparity map such that the composite stereo disparity map has an effective dynamic range greater than either of the associated dynamic ranges of the first disparity map and the second disparity map.

8. The method of claim 7, wherein the step of determining the second exposure level includes determining an area within the first stereo disparity map comprised by saturated regions and subtracting a predetermined value from the first exposure level if the area exceeds a threshold value.

9. The method of claim 7, wherein the step of determining the second exposure level includes determining an area within the first stereo disparity map comprised by dark regions and adding a predetermined value from the first exposure level if the area exceeds a threshold value.

10. The method of claim 7, wherein the step of determining a first exposure level comprises:
    evaluating a first image from a previous iteration to determine the number of saturated pixels within the first image from the previous iteration;
    determining a first difference between the determined number of saturated pixels and a target number of pixels; and
    calculating the first exposure level as a function of an exposure level associated with the first image from the previous iteration and the determined first difference.

11. The method of claim 10, wherein calculating the first exposure level includes multiplying the determined difference by a predetermined constant to obtain a product and adding the product to the exposure level associated with the first image.

12. The method of claim 10, wherein the step of determining a second exposure level comprises:
    evaluating a second image from a previous iteration to determine the number of saturated pixels within the second image from the previous iteration;
    determining a second difference between the determined number of saturated pixels within the second image and a target number of pixels; and
    calculating the second exposure level as a function of an exposure level associated with the second image from the previous iteration and the determined second difference.

13. The method of claim 12, further comprising:
    determining if a first coverage range associated with the first exposure level overlaps a second coverage range associated with the second exposure level; and
    determining a third exposure level for a third image set according to an exposure selection algorithm if the first and second coverage ranges do not overlap.

14. A method for generating a stereo disparity map having an enhanced dynamic range, comprising:
    determining a desired exposure level for each of a plurality of images, the plurality of images including a first set of images and a second set of images, wherein determining a desired exposure level comprises:
    determining the number of pixels falling within each of a plurality of intensity ranges in a region of interest within a first image;
    comparing the determined number of pixels for each range to a series of target values for the range; and
    selecting an exposure value for a second image as to minimize the sum of the squared differences between the target values and expected values associated with at least one available exposure level;
    generating each of the plurality of images at the desired level of exposure;
    merging the first set of images to produce a first composite image;
    merging the second set of images to produce a second composite image; and
    generating a stereo disparity map from the first composite image and the second composite image.

15. The method of claim 14, further comprising evaluating at least one range value associated with the stereo disparity map and discarding at least a portion of the stereo disparity map if one of the at least one range value falls outside of an acceptable range.

16. The method of claim 14, wherein the step of determining a desired level of exposure includes determining an area within a first image from a set of images comprised by dark regions and raising the exposure level for a second image if the area exceeds a threshold value.

17. The method of claim 14, wherein the step of determining a desired level of exposure includes determining an area within a first image from a set of images comprised by saturated regions and lowering the exposure level for a second image if the area exceeds a threshold value.

18. The method of claim 14, wherein the step of determining a desired level of exposure for the plurality of images includes calculating an exposure level for a second image as a function of the difference between an average saturation level over an evaluated region of a first image and a desired average saturation level for the region.

* * * * *